United States Patent [19]

Fujino et al.

[11] Patent Number: 4,890,134

[45] Date of Patent: Dec. 26, 1989

[54] PHOTOGRAPHIC INFORMATION SETTING DEVICE FOR A CAMERA

[75] Inventors: Akihiko Fujino; Hiroshi Ootsuka; Tatsuro Izumi, all of Osaka, Japan

[73] Assignee: Minolta Camera Kabushiki Kaisha, Osaka, Japan

[21] Appl. No.: 166,030

[22] Filed: Mar. 9, 1988

[30] Foreign Application Priority Data

Mar. 10, 1987 [JP] Japan .............................. 62-35317[U]
Mar. 12, 1987 [JP] Japan .............................. 62-36430[U]

[51] Int. Cl.⁴ .......................... G03B 7/00; G03B 17/18
[52] U.S. Cl. .................................... 354/442; 354/475; 354/289.4
[58] Field of Search ............................. 354/441–446, 354/465, 471, 474, 475, 289.1, 289.11, 289.12, 456, 458, 273

[56] References Cited

U.S. PATENT DOCUMENTS 4,816,853  3/1989  Kikukawa et al. ................... 354/412

FOREIGN PATENT DOCUMENTS 211027  11/1984  Japan ............................ 354/289.12
147440   7/1987  Japan .

OTHER PUBLICATIONS

Minolta α Systems, Jan. 31, 1986, pp. 144, 145, 196, 197.

Primary Examiner—W. B. Perkey
Attorney, Agent, or Firm—Burns, Doane, Swecker & Mathis

[57] ABSTRACT

A photographic information setting device for a camera of the present invention comprises mode switches for switching a first type exposure mode to a second type exposure mode, and vice versa. The changing rate for altering values relative to exposure in the first type mode is different from that in the second type mode. The changing rate of the second type mode is smaller than that of the first type mode. Values to be set in the second type mode contain values to be set in the first type mode. This device also comprises a microcomputer which shifts a value set under the second type mode to a value set under the first type mode when the second type mode is switched to the first type mode.

13 Claims, 11 Drawing Sheets

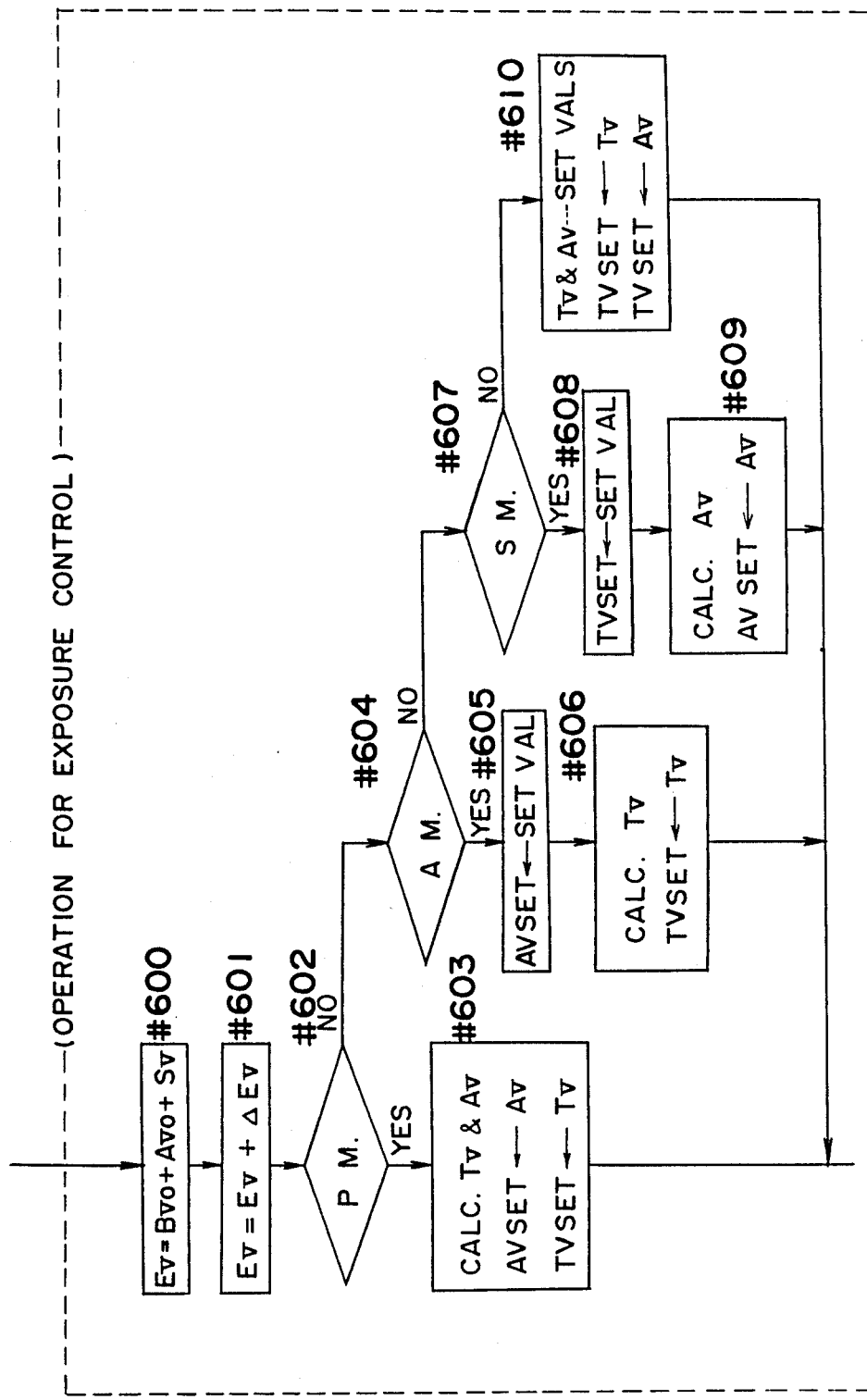
Fig. 10 —(OPERATION FOR EXPOSURE CONTROL)—

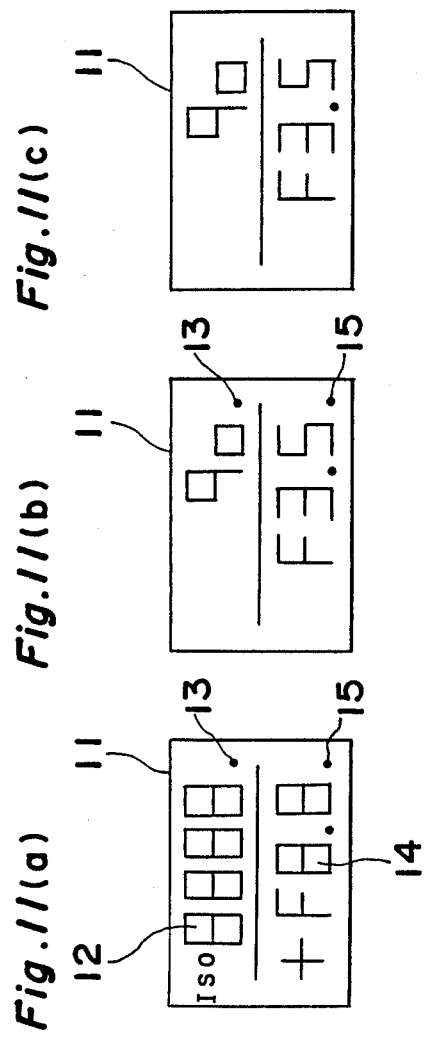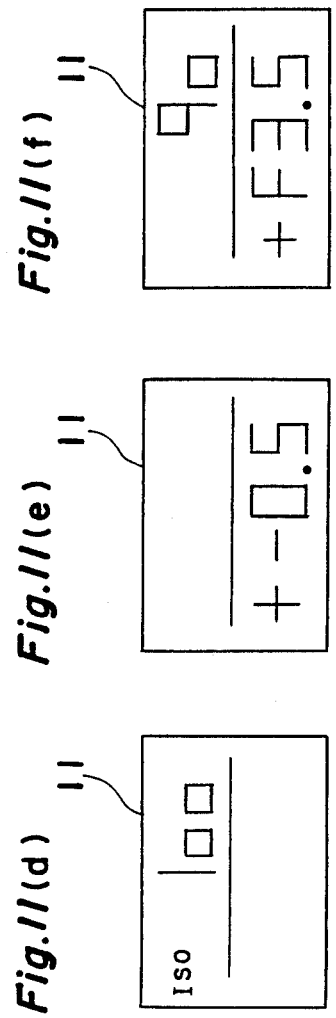

PHOTOGRAPHIC INFORMATION SETTING DEVICE FOR A CAMERA

BACKGROUND OF THE INVENTION

The present invetion relates to a photographic information setting device for setting and displaying in the viewfinder or the like of a camera photographic information relative to exposure such as shutter speed value (TV), aperture value (AV) and the like, and more particularly, to such a device including an illuminating device for illuminating such photographic information displayed.

Conventionally, some cameras each have been equipped with a photographic information setting device in which photographic information setting is effected under the control of one of a plurality of exposure modes. It can be assumed that in the first mode, shutter speed and/or aperture value are to be changed based on set values changeable at the rate corresponding to ½ of EV (exposure value). And it can be assumed that, in the second mode, the value changing rate corresponds to ¼ of EV which is smaller than the changing rate of the first mode and values to be set under the control of the second mode include values to be set under the control of the first mode. The first and second exposure modes can be switched to each other.

In the above photographic information setting device, however, when the second mode is switched to the first mode, a value to be set in the first mode is decided based on a set value used immediately before the mode switching. In other words, the value of the second mode used immediately before the mode switching is used as a reference value for setting values of the first mode. This causes the following problem: When a set value is used under the control of the second mode and the set value is one not included in the values of the first mode, it is impossible in the first mode to set shutter speed value (AV) and/or aperture value (TV) based on an integral set value corresponding to EV, as is normally done in photographing. In order to solve this problem, whenever the second mode is switched to the first mode, it has been required to re-set a value obtained through the mode switching so that the value may be one of the values of the first mode.

SUMMARY OF THE INVENTION

Accordingly, an object of the present invention is to provide a photographic information setting device which can automatically set values used for deciding shutter speed value and/or aperture value in accordance with a selected exposure mode.

Another object of the present invention is to provide an photographic information illuminating device for a camera which starts illuminating information on display when a switch is turned on and automatically stops illuminating on the completion of the preparation of the camera for photographing, such as setting of exposure values and the like.

In order to accomplish the first object, a photographic information setting and displaying device of the present invention is characterized in that it comprises mode switching means for switching a first type exposure mode in which values relative to exposure are to be altered at the changing rate of a first type and a second type exposure mode in which values relative to exposure are to be altered at the changing rate of a second type, the changing rate of the second type being smaller than that of the first type, and values of the second type mode containing values of the first type mode; and shifting means for shifting a value set under the second type mode to a value set under the first type mode when the second type mode is switched to the first type mode.

The photographic information setting device of such a construction functions as follows:

When the second type mode is switched over to the first type mode by the mode switching means, a value of the second type mode is automatically shifted to a value of the first type mode, and not to a value of other than the first type mode, by means of the shifting means.

On the other hand, in order to accomplish the second object, a photographic information illuminating device for a camera of the present invention is characterized by comprising: a photographic preparation means for setting values related with exposure control of a camera so as to prepare for the photographic operation; a manual operating means for actuating the photographic preparation means; a display means for displaying photographic information including exposure-related values set by the photographic preparation means; an illuminating means for illuminating the photographic information displayed by the display means; a switch for actuating the illuminating means; means for maintaining, after the switch is turned on, the photographic information illumination carried out by the illuminating means; and means for stopping the operation of the illuminating means when the photographic preparation means finishes its operation.

The photographic information illuminating device for a camera of the present invention functions as follows.

The manual operating means causes the photographic preparation means to start operating. When the switch is turned on and causes the illuminating means to function, photographic information obtained by the photographic preparation means and displayed by the display means is illuminated by the illuminating means. When the photographic preparation means completes its operation, the illuminating means is automatically stopped by the means for stopping the operation of the illuminating means.

The photographic information illuminating operation effected by the illuminating means when the switch is turned on never fails to be stopped on the completion of the operation of the photographic preparation means. This prevents a waste of electricity caused by the operation of the illuminating means even when it is not required.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3 through 6, 8 through 10, and 12 explain, by way of a flowchart, the preparing operation for photographing according to the embodiment;

FIG. 7 shows the relationship between the exposure modes and the exposure mode selection switch at its "on" and "off" positions;

FIGS. 11(a)–11(f) show examples of photographing information shown on the display.

DETAILED DESCRIPTION OF THE PREFERRED EMBODIMENTS

Figure 1:
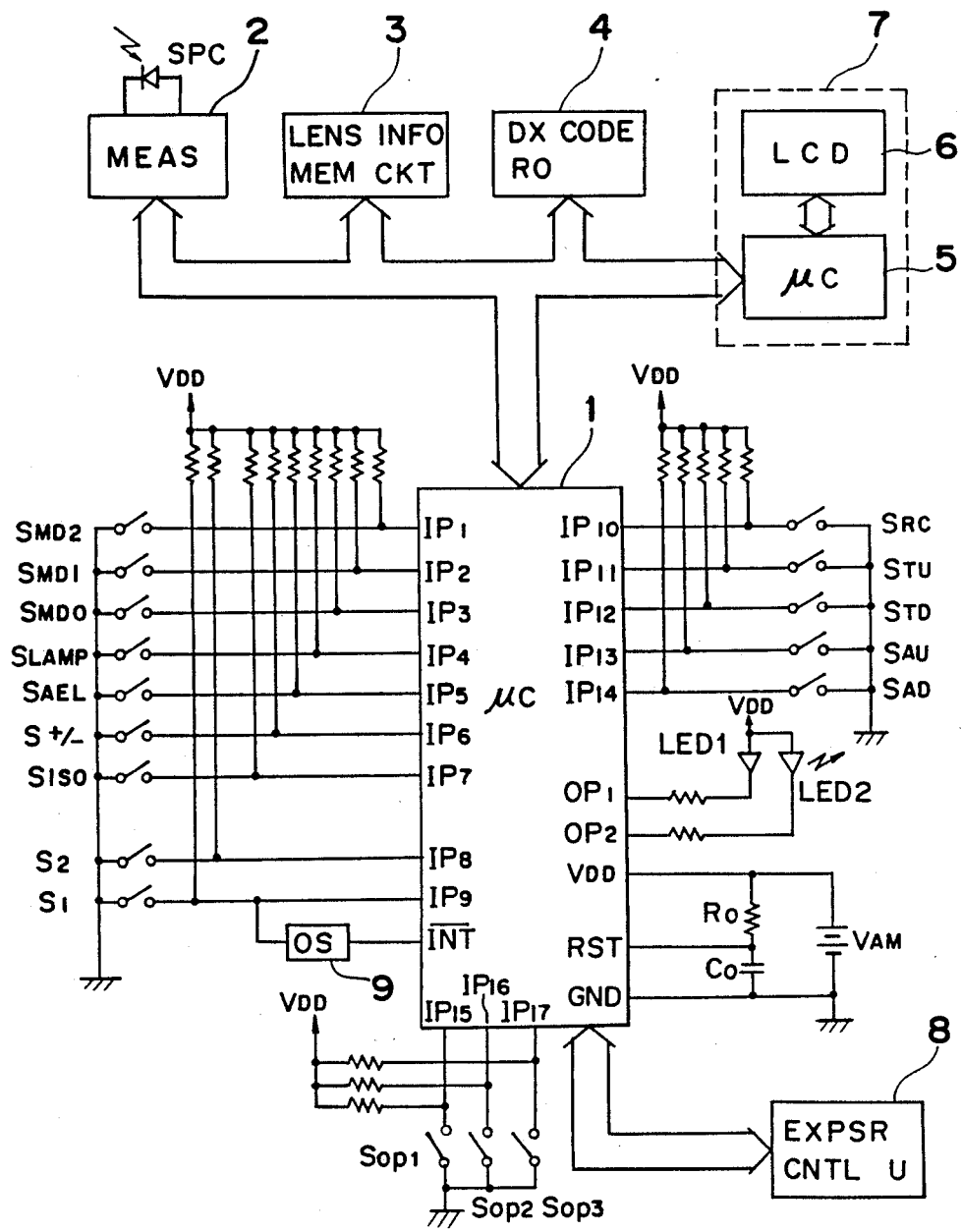
FIG. 1 is a block diagram illustrative of an embodiment of the present invention.

The diagram of FIG. 1 shows a microcomputer 1 which performs a sequential control, exposure computation, etc. of a camera, a light measuring portion 2 which measures the luminance of an object, a lens, information memory circuit 3, a DX code readout portion 4, a display portion 7 which consists of a microcomputer 5 for display and a liquid crystal display (LCD) 6, and an exposure controller 8.

The light measuring portion 2 receives electric signals from a light receiving element such as a silicon photoelectric cell (SPC), which performs photoelectric conversion of light inputted through a lens (not shown in the drawings). Then, the light measuring portion 2 converts the input signals into the digital form and outputs corresponding luminance (BV) in terms of apex value to the microcomputer 1. The lens information memory circuit 3 is a circuit for storing lens information of a settled lens and provides a fully opened aperture value ($AV_0$) in terms of apex value in the form of digital signals to the microcomputer 1. The DX code readout portion 4 reads out the electric code (hereinafter referred to as "DX code") which is carried by a film cassette loaded and represents film information such as film speed and the like, and supplies the DX code in the form of a digital signal to the microcomputer 1. The microcomputer 5 for display in the display portion 7 receives data for the display outputted by the microcomputer 1, decodes them, and provides the results to the liquid crystal display (LCD) 6 for the relevant display. The exposure control unit 8 controls the exposure in response to a relevant depression of the release button and on the basis of exposure information determined by the microcomputer 1.

A switch denoted by S1 is one for preparing the camera for photographing, which is turned on by a first depressing stroke of the release button (not shown in the drawings). When this switch S1 is turned on, an impulse is inputted through a one-shot circuit 9 to the microcomputer 1 at the interrupt terminal $\overline{INT}$, so that the microcomputer 1 executes an interruptive routine INTRPT (described later) for preparing the camera for photographing, such a preparing operation including input of photographing information (described later), exposure computation, and display of photographing information. A switch denoted by S2 is a release switch which is turned on by a second depressing stroke (a stroke deeper than the first depressing stroke) of the release button not shown. When this release switch S2 is turned on, the exposure control is carried out.

A switch denoted by S ISO is one for altering the film speed. When this switch S ISO and either an up-switch denoted by S TU or a down-switch S TD, both the two latter switches being disposed at the upper part of the camera body, are turned on, the film speed value is altered by adding or substracting a value corresponding to ⅓ EV. A switch denoted by S ± is one for correcting the exposure. In one case, when this exposure correcting switch S ± is turned on, it maintains the exposure correcting mode and in the other case, the switch permits the exposure amount correction to be carried out only when it has been turned on. In either case, when this switch is used in conjunction with either the up-switch S TU or down-switch S TD disposed at the upper part of the camera body, it permits the exposure to be corrected in increments or decrements corresponding to ⅓ EV. A switch denoted by S AEL is an AE lock switch, which is used to memorize the exposure value (This operation will hereinafter be referred to as "AE lock"). A first turn of this switch S AEL sets an AE lock and a second turn of the switch ends the AE lock.

A switch denoted by the S LAMP is a photographic information illuminating switch, which is used to illuminate the display in a viewfinder. The illumination goes on by a single operation such as a depressing stroke, for example, of the switch, and goes off as the source power is cut off. Each of switches denoted by S MD0, S MD1 and S MD2 is a mode judgment switch, whose "on" or "off" is decided according to which one mode is selected by button manipulation from among the following five exposure modes: programmed automatic exposure control mode (hereinafter referred to as P mode), shutter priority automatic exposure control mode (hereinafter referred to as S mode), aperture priority automatic exposure control mode (hereinafter referred to as A mode), first manual exposure control mode (hereinafter referred to as M mode), and second manual exposure control mode (hereinafter referred to as M/2 mode) which is capable of altering set values for photographic information (AV, TV) by value corresponding to ⅙ EV, which is a half of the value by which the set values for photographic information are to be altered, in the P, S, A or M mode. The microcomputer 1 judges the exposure mode selected by the photographer on the basis of the relationship between the respective exposure modes and the combinations of "ons" and "offs" of the mode judgement switches S MD0, S MD1, and S MD2. A switch denoted by S RC is linked with the rear lid in such a manner that this switch is turned on when the rear lid is opened and turned off when it is closed. The up-switch S TU and down-switch S TD, disposed at the upper part of the camera body, are used not only for correcting the exposure amount and altering the film speed in the manner of addition or substraction as described hereinbefore but also for altering the shutter speed in M mode or M/2 mode and for altering the priority values in S mode or A mode. Switches denoted by S AU and S AD, disposed beside the lens mount, are an up-switch and a down-switch respectively which are used for increasing or decreasing the aperture size in M mode or M/2 mode and also for increasing or decreasing the priority values in S mode or A mode.

Figure 2A:
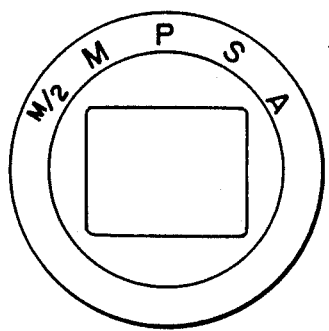
FIGS. 2(a)–2(b) show with respect to the option mode and normal mode, the sequences in which the exposure mode is altered.
Figure 2B:
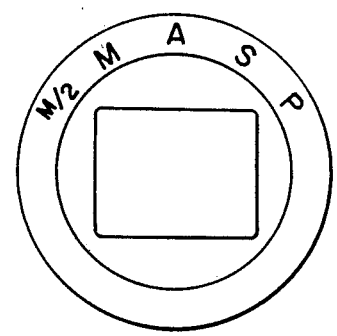

Switches denoted by S OP1, S OP2 and S OP3 are optional switches which are used to alter some specific functions as desired by the photographer. The switch S OP1 is used to alter the sequence in which the exposure modes (P, S, A, M, and M/2) are selected when the mode selection is altered. When the switch S OP1 is on, the sequence is as shown in FIG. 2(a) (option mode), and, when the switch is off, the sequence is as shown in FIG. 2(b) (normal mode). The switch S OP2 is used to alter the relationship between the AE lock and the power source retention of the camera. This switch S OP2 when turned on actuates a timer for the power source retention, and, when the timer winds down or completes the specified time counting, the power source retention and AE lock are ended. When the switch S OP2 is off, the timer does not function and the power source is retained while AE lock is in operation. The switch S OP3 is used to alter the duration for which the power source is retained. When this switch S OP3 is off, the power source is retained for 10 seconds (after the switch S1 has been turned off), and, when the switch S OP3 is on, the duration of power source retention is altered to 15 seconds. These optional switches are not used in general, except when some alterations are desired by the photographer. However, to render it simple to make such alterations when required, these switches are disposed at positions where they are conveniently handled by simply removing the identification plate, i.e., the bottom cover of the camera body or the top cover.

A light-emitting diode denoted by LED 1 is to illuminate the inside of the viewfinder and one denoted by LED 2 is, when the AE lock is in operation, to indicate its in-operation in the viewfinder.

Figure 3:
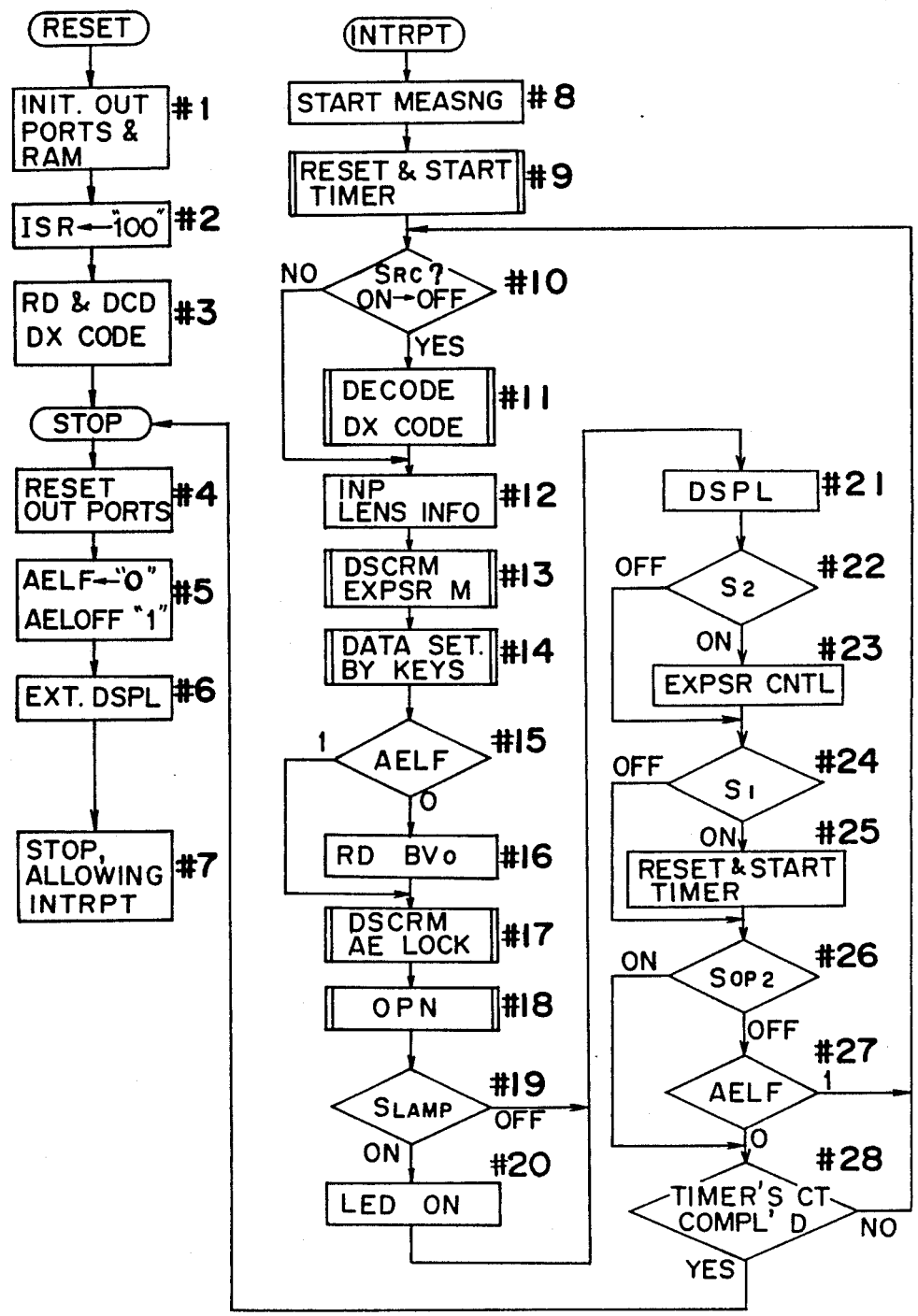

A photographic information-setting device of a camera provided with the photographic information setting and displaying devices of the above described construction operates as follow:

When a battery V AM is put in place, a signal "H" is inputted to the microcomputer 1 through the terminal RST so that the microcomputer 1 executes a reset routine as shown in FIG. 3.

At step #1, RAM (random access memory) and the output ports in the microcomputer 1 are initialized.

At Step #2, a film speed ISO100 (i.e. SV=5) is stored in ISO register. The control and display of the exposure of the camera are based on the film speed SV (hereinafter referred to as "ISO value") represented by an apex value stored in this ISO register.

At Step #3, the DX code on the film cassette is read out and decoded.

The routine for reading out and decoding the DX code is described in detail hereinafter with reference to FIG. 4.

At Step #100, the microcomputer 1 reads out the DX code on the film container by means of the DX code readout portion 4.

At Step #101, it is decided whether or not the film container bears its DX code. When the film container bears its DX code, the program flow proceeds to Step #102, and if it does not, the program flow proceeds to Step #105.

At Step #102, the DX code read out is decoded into an ISO valve (SV).

At Step #103, the ISO value (SV) resulting from the decoding at Step #102 is compared with the data in DX ISO register, i.e., ISO value (SV) of a previous DX code which was stored therein immediately before. If the ISO values differs from each other, the program flow proceeds to Step #104. If those values are the same, Step #104 is skipped.

At Step #104, to which the program flow has proceeded because of difference of the ISO value (SV) only just obtained from that stored in DXISO register, in other words, because the film speed of the actually used film differs from that of the film used immediately before, the data in the ISO register and that in DXISO register are superseded with the current ISO value (SV) which has just been obtained by decoding.

When correction of the film speed has been done with a previous film, loading of a new film of the same film speed as that of the previous one or replacement of the battery V AM does not require a repeated operation for correcting the film speed, provided that the film speed corrected prior to the film reloading or battery replacement is retained.

At Step #105, to which the program flow has proceeded from the Step #101 because the loaded film container does not bear a DX code, DXISO register is cleared to "0".

When the film container does not bear a DX code, the DXISO register is cleared to "0" for the following reason. Assume that a film of film speed ISO 100 which does not bear a DX code on its container is used with the film speed corrected from that ISO 100 to ISO 125 after the use of an ISO 200 film bearing a DX code on its container without film speed correction. Thus, the ISO register which controls the exposure of the camera has the corrected film speed of ISO 125 and the DXISO register has ISO 200 which is the film speed of the preceding film. If, next, a ISO 200 film which bears a DX code on its container is loaded, the film speed newly read out is determined to be identical with that stored in the DXISO register, so that the routine for reading out and decoding DX code is executed through Steps #100, #101, #102 and #103 and by skipping Step #104. As a result, the ISO register keeps ISO 125 and the DXISO register ISO 200. The problem is that the ISO register for controlling the camera is caused to have ISO 125 although the DX code indicates ISO 200. In order to preclude such a problem, when the DX code is found to be missing from a film container at Step #101, a value which is not used as an ISO value of DX code ("0" in the embodiment) is stored in DXISO register at Step #105 so that, when a film bearing its DX code on its container is loaded next, the DX code readout-decoding routine will be executed certainly through Step #104 so as to renew the data in ISO register.

The routine for "reset", which has been described above, is followed by one for "stop," which is illustrated in FIG. 3. In the routine for stop, the microcomputer effects controlling according to the completion of the photographing.

At Step #4, the microcomputer 1 resets all the output ports and by so doing turns off the light-emitting diode LED2 whose lighting indicates the AE lock being in operation, while it turns off the light-emitting diode LED1 for illumination in the viewfinder, which has been turned on by the switch S LAMP for the illumination. Thus this diode LED1 for the viewfinder illumination, even though turned on manually, is certain to be turned off by the microcomputer 1 when it executes the routine for "stop."

At Step #5, the flag AELF which indicates the AE lock in operation is reset or turned off, and the flag AELOFF which indicates that the AE lock switch is off is set or turned on.

At Step #6, to turn off the liquid crystal display 6, a signal for turning off the display is inputted to the microcomputer 5 for display.

At Step #7, the microcomputer 1 stops its controlling, permitting the interruption for setting or preparing the camera for photographing, which interruption is represented by a depressing of the release button (i.e., the switch S1 for setting the camera for photographing is turned on).

The following describes the routine of the interruption carried out by a first depressing stroke of the release button by the photographer, which turns on the switch S1 for setting the camera for photographing.

At Step #8, to measure the luminance of the object, the microcomputer 1 causes the light measuring portion 2 to carry out the photometric action by providing a relevant signal there.

At Step #9, the timer for power source retention is reset and started.

Figure 5:
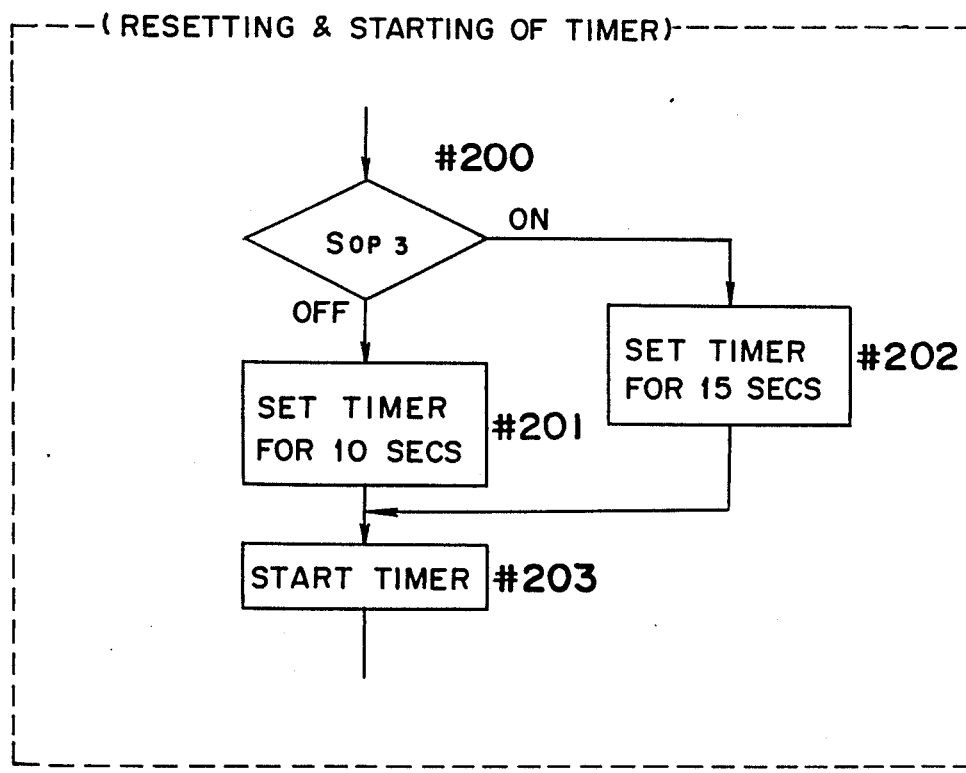

The details of the routine for resetting and starting the timer are described hereinbelow with reference to FIG. 5.

At Step #200, it is checked whether the optional switch S OP3 is on or off. If the switch is on, the timer is set for 15 seconds at Step #202, and the routine is followed to Step #203. If the switch is off, the timer is set for 10 seconds at Step #201, and the routine is followed to Step #203.

At Step #203, the timer is started. After resetting and starting the timer as above, the program proceeds to Step #10 as shown in FIG. 3.

At Step #10, it is checked whether or not there has been a change with respect to opening and closing of the rear lid. If there has been a change from the opened state to closure (the rear lid switch S RC has been turned to the "off" position from the on position), the program proceeds to Step #11. Otherwise, Step #11 is skipped.

Figure 4:
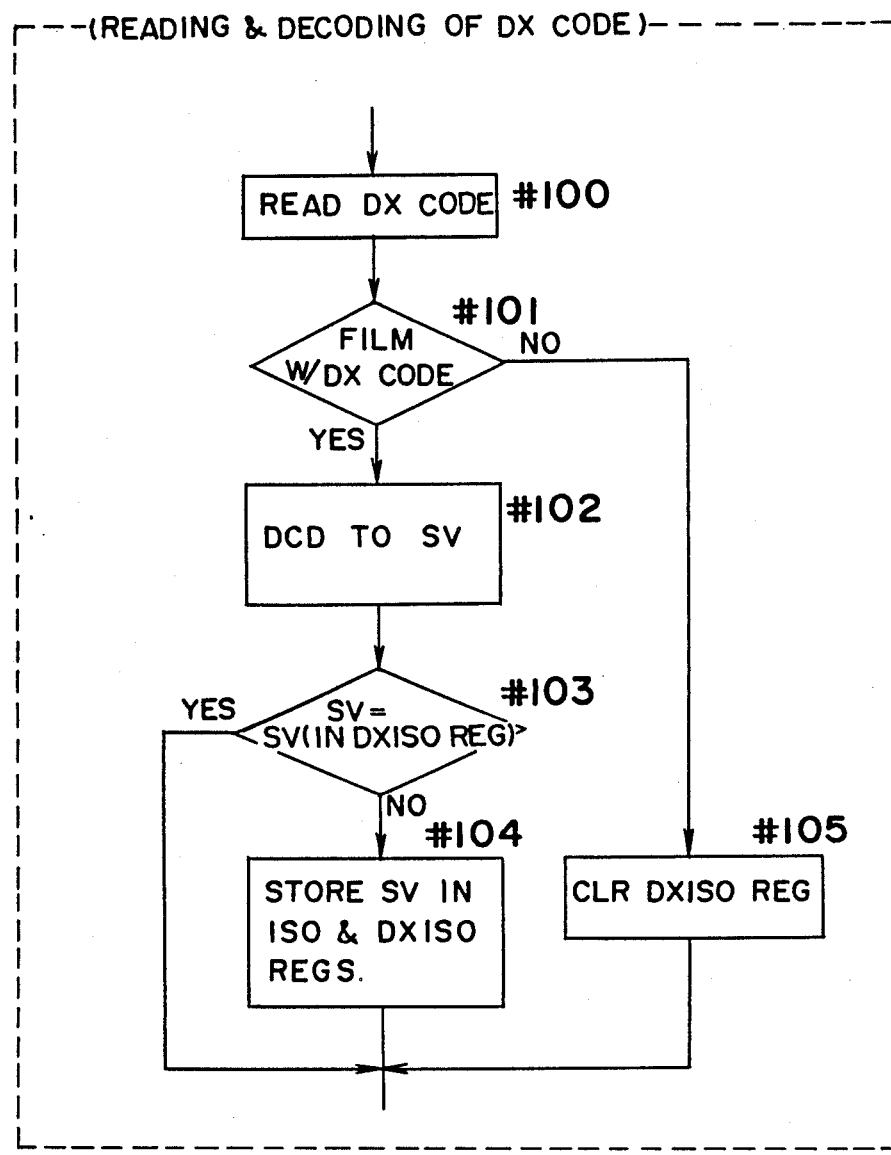

At Step #11, to which the operation has proceeded because of a change of the rear lid from the opened state to closure, a new film is regarded as having been loaded and the routine for reading out and decoding the DX code is carried out, starting with reading out the DX code on the film container, as shown in FIG. 4, and then the program proceeds to Step #12.

At Step #12, the fully opened aperture value $AV_0$ of the lens mounted to the camera is outputted from the lens information memory circuit 3 of the lens and stored in a memory (not shown in the drawings).

At Step #13, the exposure mode selected by the photographer is checked.

Figures 6, 7:
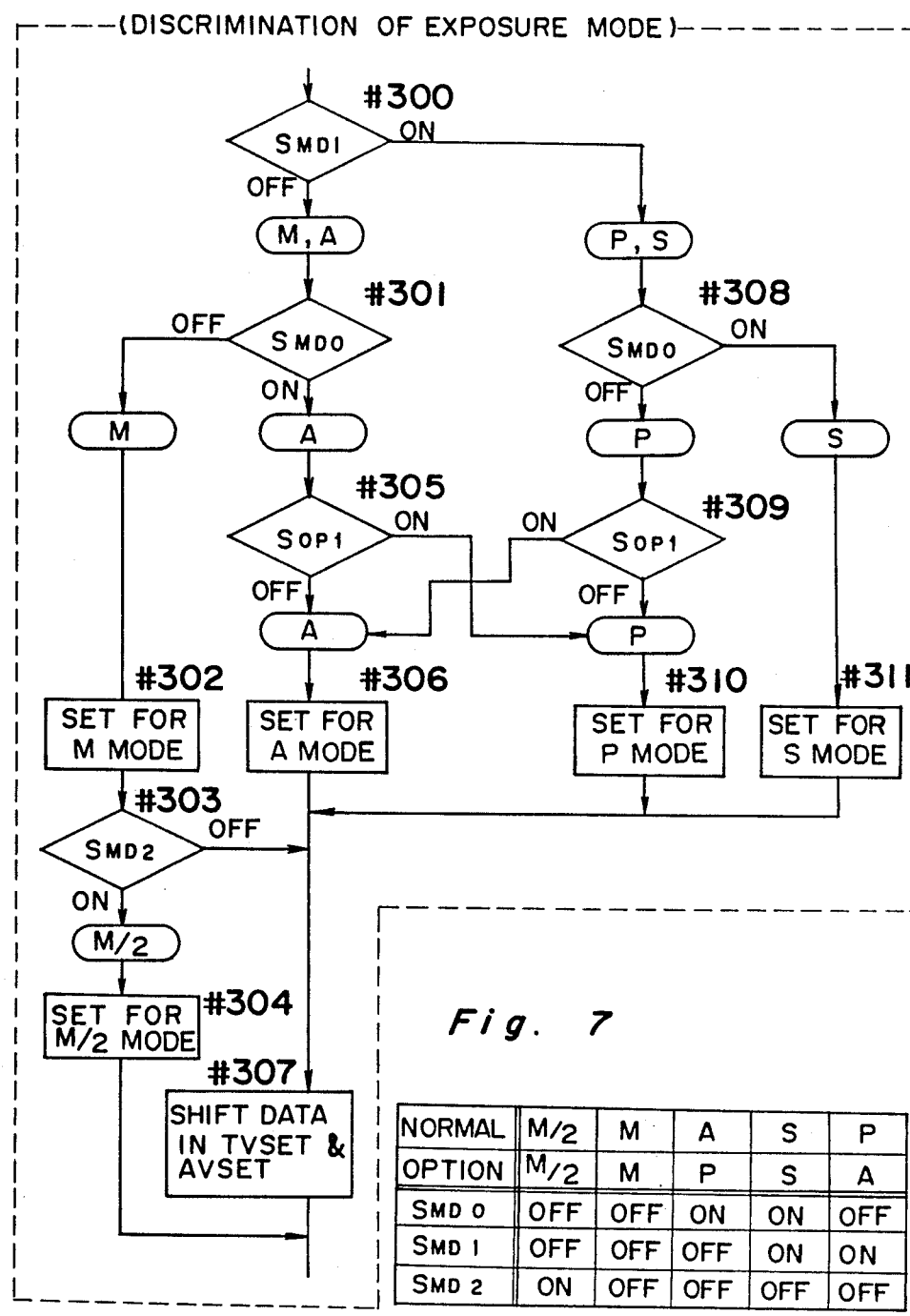

With reference to FIGS. 6 and 7, the details of the routine for checking the exposure mode are described next.

At Step #300, it is checked whether the mode switch S MD1 is off or not. If it is off, the exposure mode selected is discriminated to be one of M mode, M/2 mode and A mode, as shown in FIG. 7, and the program proceeds to #301. If not, the exposure mode selected is discriminated to be either the S mode or P mode, and the program proceeds to Step #308.

At Step #301, it is checked whether the mode switch S MD0 is off or not. If it is off, the camera is set to M mode Step #302, and the program proceeds to Step #303. If the mode switch S MD0 is not off, the exposure mode selected is discriminated to be A mode, and the program proceeds to Step #305.

At Step #303, it is checked whether the mode switch S MD2 is on or not. If it is on, the exposure mode is assumed to be M/2 mode, as shown in FIG. 7, and the exposure mode set at Step #302 is superseded by M/2 mode at Step #304. If the mode switch is off, M mode set at Step #302 is confirmed, and the program proceeds to Step #307.

At Step #305, to which the operation has proceeded from Step #301 because the mode switch S MD0 was found to be on, it is checked whether the option switch S OP1 for altering the changing sequence of the exposure modes is on or not. If it is on, the exposure modes are discriminated to be of the option mode (see FIG. 2(a), and since, as shown in FIG. 7, the order of arrangement of the exposure modes in the normal mode (see FIG. 2(b)) is opposite to that in the option mode with respect to A and P modes, the exposure which was assumed to be of A mode at Step #301 is now regarded as P mode, and so the camera is set to P mode at Step #310, and then, the program proceeds to Step #307. If the option switch S OP1 is off, the camera is set to A mode at Step #306, and the program proceeds to Step #307.

At Step #308, it is checked whether the mode judgement switch S MD0 is off or not. If it is off, the exposure mode selected is judged to be P mode, as shown in FIG. 7, and the program proceeds to Step #309. If not, the exposure mode selected is discriminated to be S mode, and so the S mode is set for the exposure mode at Step #311, and the program proceeds to Step #307.

At Step #309, it is checked whether the option switch S OP1 is on or not. If it is on, the exposure modes are judged to be of the option mode, and the exposure mode which was regarded as P mode at Step #308 is now regarded as A mode, and then, the program proceeds to Step #306. On the other hand. If the same switch is discriminated to be off, P mode is confirmed, and the program proceeds to Step #310.

When the exposure mode has been identified as the M/2, M, A, P or S mode at Step #303, #306, #310 or #311 as described above, the program proceeds to Step #307.

The five exposure modes are divided into the following two types in accordance with changing degrees by which set values representing the photographic information (AV, TV) are to be varied: a first type mode, which permits a set value to be increased or decreased by a value corresponding to $\frac{1}{2}$ EV, and a second type mode, which permits a set value to be changed at the rate of $\frac{1}{4}$ EV in addition to the rate of the first type mode. Each of P, S, A and M modes belongs to the first type mode, whereas M/2 mode the second type mode.

At Step #307, when the exposure mode selected is of the first type mode, data AV in the controlled aperture value register AVSET and data TV in the controlled shutter speed value register TVSET, both for controlling the exposure of the camera, are shifted respectively to the other type data AV and TV, each of which is variable at the rate corresponding to $\frac{1}{2}$ EV.

The details of Step #307 are as follows:

Assume that the second type mode (M/2 mode) is now selected for the exposure mode, and the shutter speed TV is set at $6\frac{3}{4}$ and the aperture value AV at $3\frac{3}{4}$, those values being stored in the controlled shutter speed value register TVSET and the controlled aperture value register AVSET respectively. Next, the first type mode is selected for the exposure mode, and when the routine for identifying the exposure mode identifies the actually selected exposure mode as the first type mode through Steps #303, #306, #310, and #311, then, at Step #307, the data in the controlled aperture value register AVSET and that in the controlled shutter speed value register TVSET are shifted from values of the second type mode whose changing rate, that is, increment or decrement, corresponds to $\frac{1}{4}$ EV to values of the first type mode whose changing rate corresponds to $\frac{1}{2}$ EV. In the data shifting, values of the second type mode which do not meet the values of the first type mode are neglected. Thus the shutter speed TV of $6\frac{3}{4}$ and the aperture value AV of $3\frac{3}{4}$, both of the second type mode, are converted into $6\frac{1}{2}$ and $3\frac{1}{2}$ respectively.

When the exposure mode has been converted from the second type mode to the first type mode, the shutter speed and the aperture are shown on the display in the following manner. FIG. 11(a) is an example of how an entire representation of photographic information is shown by liquid crystal at the display portion 11. Digits 12 to be displayed in the upper portion of the display portion 11 indicate the shutter speed (the data in the controlled shutter speed value register TVSET) or the film speed (the data in the ISO register), the shutter speed graduation corresponding to ½ EV when controlled by the first type mode and the film speed graduation corresponding to ⅓ EV. The dot 13 on the right of the digits 12, displayed only when the digits 12 indicate the shutter speed, signifies that the shutter speed is controlled under the second type mode (M/2 mode) in which increment or decrement in changing set values corresponds to ¼ EV. Digits 14 to be displayed in the lower portion of the display portion 11 indicate an aperture value (the data in the controlled aperture value register AVSET) or corrected exposure value (the data in the corrected exposure register ΔEV), both of those values are to be altered by steps of ½ EV when controlled under the first type mode. The dot 15 on the right of the digits 14 signifies that, when the camera is under second type mode, aperture values or corrected exposure values to be displayed are controlled by steps of ¼ EV.

For example, when the second type mode is selected for the exposure mode and the shutter speed TV and the aperture value AV are set at 6¾ and 3¼ respectively, the photographic information display unit 11 will produce data, including the dots 13 and 15, on the display as shown in FIG. 11(b). When the camera is switched to the first type mode, the shutter speed TV and the aperture value AV will be changed to 6½ and 3½ respectively. Thus the dots 13 and 15 will disappear and the display will change in appearance from FIG. 11(b) to FIG. 11(c). In other words, data on display in FIG. 11(b) and FIG. 11(c) are the same in appearance, but are different from each other in signification due to the dots 13 and 15. If the shutter speed TV and the aperture value AV are set at 6½ and 3½ respectively under control of the second type mode, the display as shown in FIG. 11(c) will result. Thus, when the first type mode is used, values set according to the second type mode are automatically shifted to values set according to the first type mode, and hence values of AV and TV after shifted are to be given increments or decrements according to the first type mode. There is no possibility, therefore, that the values of AV and TV may be given other increments or decrements than those in the first type mode.

The routine for judging the exposure mode, when terminated, is followed by operation at Step #14 as shown in FIG. 3.

At Step #14, photographic information is set by the microcomputer 1 under the control by alteration keys.

Figure 8:
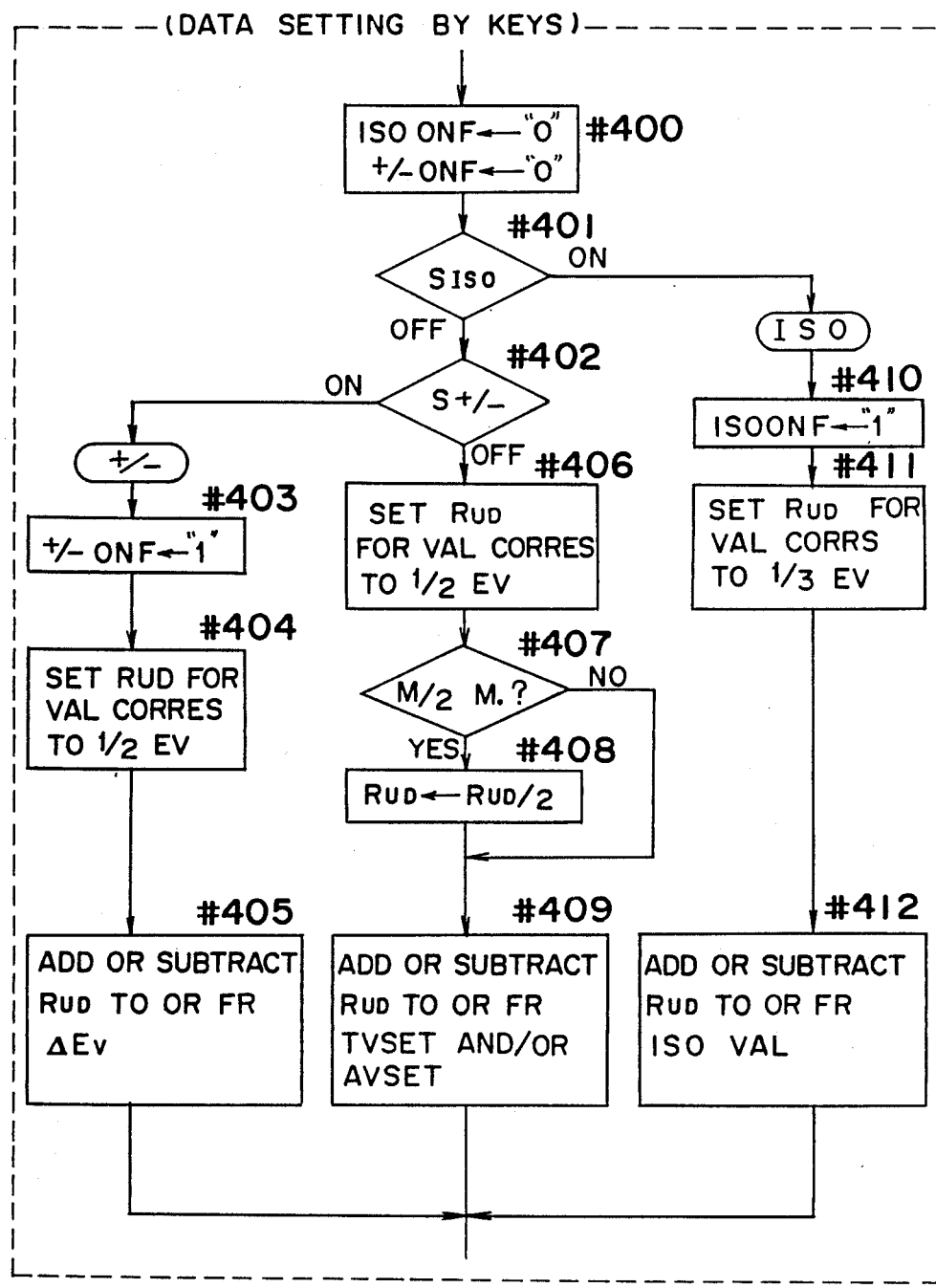

The details of the routine of data setting by alteration keys are described next with reference to FIG. 8.

At Step #400, the microcomputer 1 turns off the film speed alteration switch-on flag ISOONF and the exposure correction switch-on flag ±ONF.

At Step #401, it is checked whether the film speed alteration switch S ISO is on or not. If it is on, the microcomputer discriminates the film speed alteration to be required, and then, the program proceeds to Step #410. If the switch S ISO is not on, the program proceeds to Step #402.

At Step #410, the film speed alteration switch-on flag ISOONF is set or turned on.

At Step #411, the film speed value corresponding to ⅓ EV, which is taken as a unit for altering the film speed, is inputted to register R UD in which the degree of film speed alteration is to be stored.

At Step #412, the value stored in the register R UD is added to or subtracted from the data in the ISO register according to whether the up-switch S TU or the down-switch S TD is changed from an off-state to an on-state. Then, the program proceeds to the next step.

At Step #402, it is checked whether the exposure compensation switch S± is on or not, if it is on, the exposure is regarded as requiring correction, and the program proceeds to Step #403. If not, the program proceeds to Step #406.

At Step #403, the exposure correction switch-on flag ±ONF is set.

At Step #404, value corresponding to ½ EV is set in the register R UD in which the degree of alteration of exposure is to be stored.

At Step #405, the corrected exposure register ΔEV is provided with the value as increment or decrement, which corresponds to the value stored in the register R UD according to whether the up-switch S TU or the down-switch S TD is turned on. Then, the program proceeds to the next step.

At Step #406, to which the program has proceeded from Step #402 because the exposure compensation switch S± was not on, the value corresponding to ½ EV is set in the register R UD in which the degree of alteration is to be stored.

At Step #407, it is checked whether the exposure mode is the M/2 mode or not. If it is, then, the program proceeds to Step #408. If not, Step #408 is skipped.

At Step #408, where the exposure mode is M/2 mode, the value set in the register R UD at Step #406 is reduced to ½. Then, the program proceeds to Step #409.

At Step #409, when the exposure mode is the A mode or S mode, the controlled shutter speed value register TVSET is provided with the value, as an addend or subtrahend, stored in the register R UD in which the degree of alteration of exposure is to be stored, according to whether the up-switch S TU or the down-switch S TD is switched on, while the controlled aperture value register AVSET is provided with the value in the register R UD as an addend or subtrahend according to whether the up-switch S AU or the down-switch S AD is turned on. When the exposure mode selected is the M mode or M/2 mode, the controlled shutter speed value register TVSET is provided with the value corresponding to the register R UD in the manner of addition or substraction according to whether the switch S TU or S TD is switched on, while the controlled aperture value register AVSET is provided with the value corresponding to the register R UD in the manner of addition or subtraction according to whether the switch S AU or S AD is switched on. Then, the program proceeds to the next step.

The routine for data setting by alteration keys, when terminated, is followed by Step #15 as shown in FIG. 3.

At Step #15, it is checked whether the AE lock flag AELF for indicating AE lock in operation has been set or not. If it has not been set yet, measured value $BV_0$ is read out of the light measuring portion 2 at Step #16. If it has, no change is made in the measured value, and the program proceeds to Step #17, skipping Step #16.

At Step #17, it is discriminated whether the AE lock is in operation or not.

Figure 9:
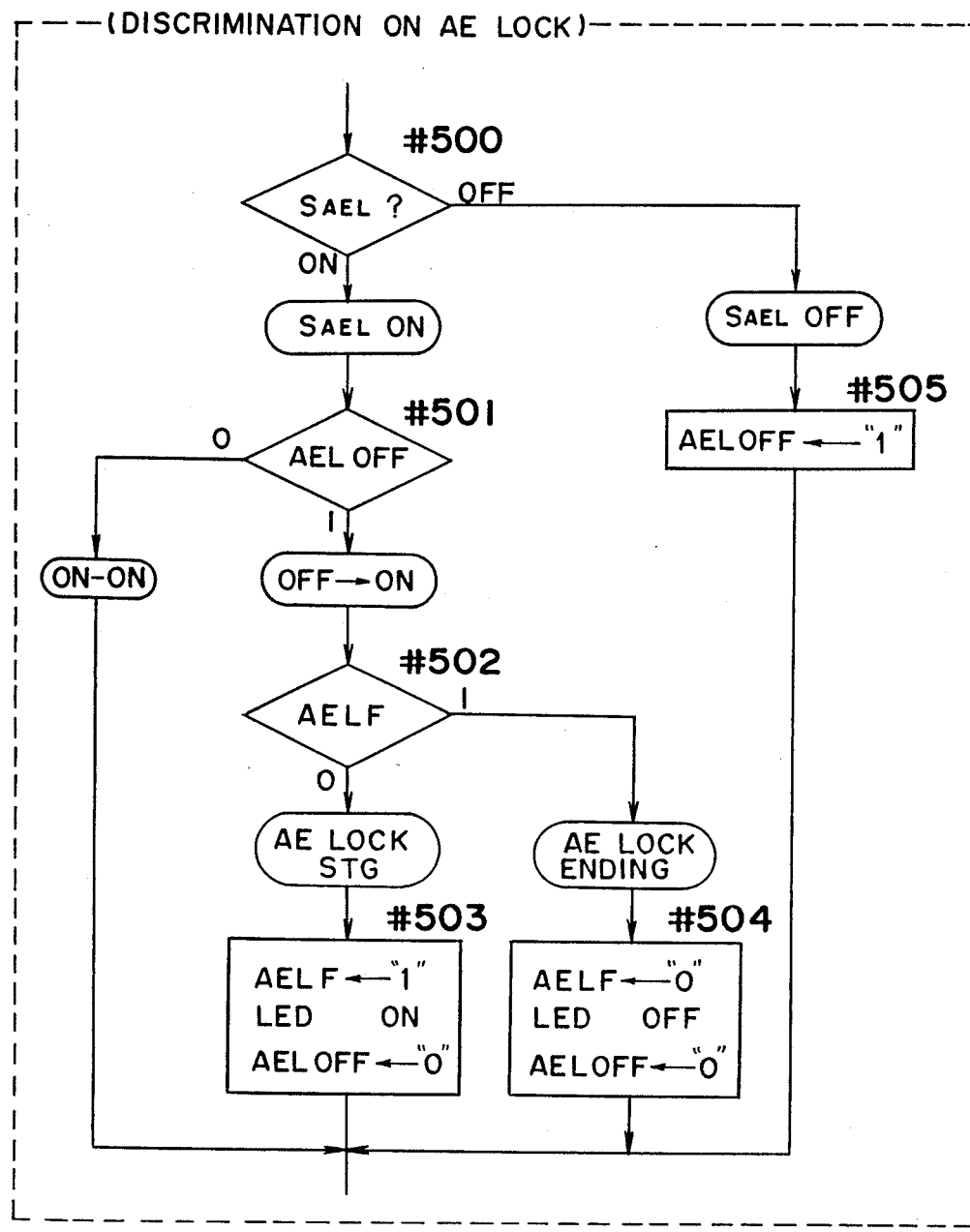

The details of the routine for discrimination on AE lock are described next with reference to FIG. 9.

At Step #500, the microcomputer 1 checks whether or not the AE lock switch S AEL, which causes the AE lock, is on or not. If it is off, the AE lock-off flag AEL-OFF, which indicates that the AE lock-switch S AEL is off, is set at Step #505, and then the program proceeds to the next step. If the AE lock switch S AEL is on, the program proceeds to Step #501.

At Step #501, it is checked whether the AE lock-off flag AELOFF has been set or not. If it has been set already, the AE lock switch S AEL is regarded as having been off when the previous routine for discrimination on AE lock was executed (it is considered that the previous routine was executed through Step #505 and subsequently the AE lock switch S AEL has been turned on), and the program proceeds to Step #502. If the flag AELOFF has not been set, it is considered that the AE lock switch S AEL was on at the previous step for checking on AE lock, and so, the AE lock is considered to be in operation, and the program proceeds to the next step.

At Step #502, it is checked whether the AE lock flag AELF, which indicates the AE lock in operation, has been set or not. If it has been set already, the program proceeds to Step #504. If not, the program proceeds to Step #503.

At Step #503, where the AE lock flag AELF is not set, it is considered that the AE lock has been started, and so, the AE lock flag AELF is set, the light-emitting diode LED2 for indicating the AE lock in operation is turned on, and AE lock-off flag AELOFF is reset or turned off, and then, the program proceeds to the next step.

At Step #504, where the AE lock flag AELF has been set already, it is considered that the AE lock switch S AEL was operated so as to terminate the AE lock, so that the AE lock flag AELF is reset, the light-emitting diode LED2 is turned off, and the AE lock-off flag AELOFF is reset. The AE lock-off-flag AELOFF is reset as above in order to preclude the AE lock from being carried out repeatedly through Steps #501, #502 and #503 in case that the AE lock switch S AEL is kept in an on-state so as to terminate the AE lock.

The routine for discrimination on AE lock, when it is terminated, is followed by Step #18 as shown in FIG. 3.

At Step #18, the microcomputer 1 does calculations to compute the shutter speed TV and the aperture value AV for the control of the exposure.

The routine for operation for the exposure control is described in detail hereinbelow with reference to FIG. 10.

At Step #600, the microcomputer 1 computes the exposure value EV on the basis of the luminance $BV_0$ of the object, fully-opened or minimum lens aperture value $AV_0$, and film speed SV, the first two values having been detected and stored.

At Step #601, the above obtained exposure value EV is corrected using the exposure correction value $\Delta EV$.

At Step #602, it is checked whether the exposure mode selected is P mode or not. If it is P mode, the program proceeds to Step #603. If not, the program proceeds to #604.

At Step #603, where the exposure mode selected is P mode, the shutter speed TV and the aperture value AV are computed from the corrected exposure value EV by a known calculating method, and the values thereby obtained are stored in the controlled aperture value register AVSET and the controlled shutter speed value register TVSET, respectively.

At Step #604, it is checked whether the exposure mode is A mode or not. If it is A mode, the set aperture value is stored in the controlled aperture value register AVSET at Step #605.

At Step #606, shutter speed TV is calculated from the corrected exposure value EV by using the aperture value AV preliminarily set, and the result is stored in the controlled shutter speed value register TVSET. Then, the program proceeds to the next step.

At Step #607, it is checked whether the exposure mode selected is S mode or not. If it is S mode, the preset shutter speed value is stored in the controlled shutter speed value register TVSET at Step #608.

At Step #609, the aperture value AV is computed and stored in the controlled aperture value register AVSET. Then, the program proceeds to the next step.

At Step #610, if the exposure mode selected is not P mode, A mode, or S mode, the preset shutter speed value TV and aperture value AV are stored in the registers TVSET and AVSET respectively.

The routine for calculation for exposure control, when terminated, is followed by Step #19 as shown in FIG. 3.

At Step #19, the microcomputer 1 checks whether the viewfinder-illuminating switch S LAMP is on or not. If it is on, the light-emitting diode LED1 for illuminating the view finder is turned on at Step #20, and the illumination is maintained thereafter even if the switch S LAMP is turned off, as long as the microcomputer 1 retains the power source. If the switch S LAMP is not in operation, Step #20 is skipped.

At Step #21, the microcomputer 1 show the photographic information on the display.

Figure 12:
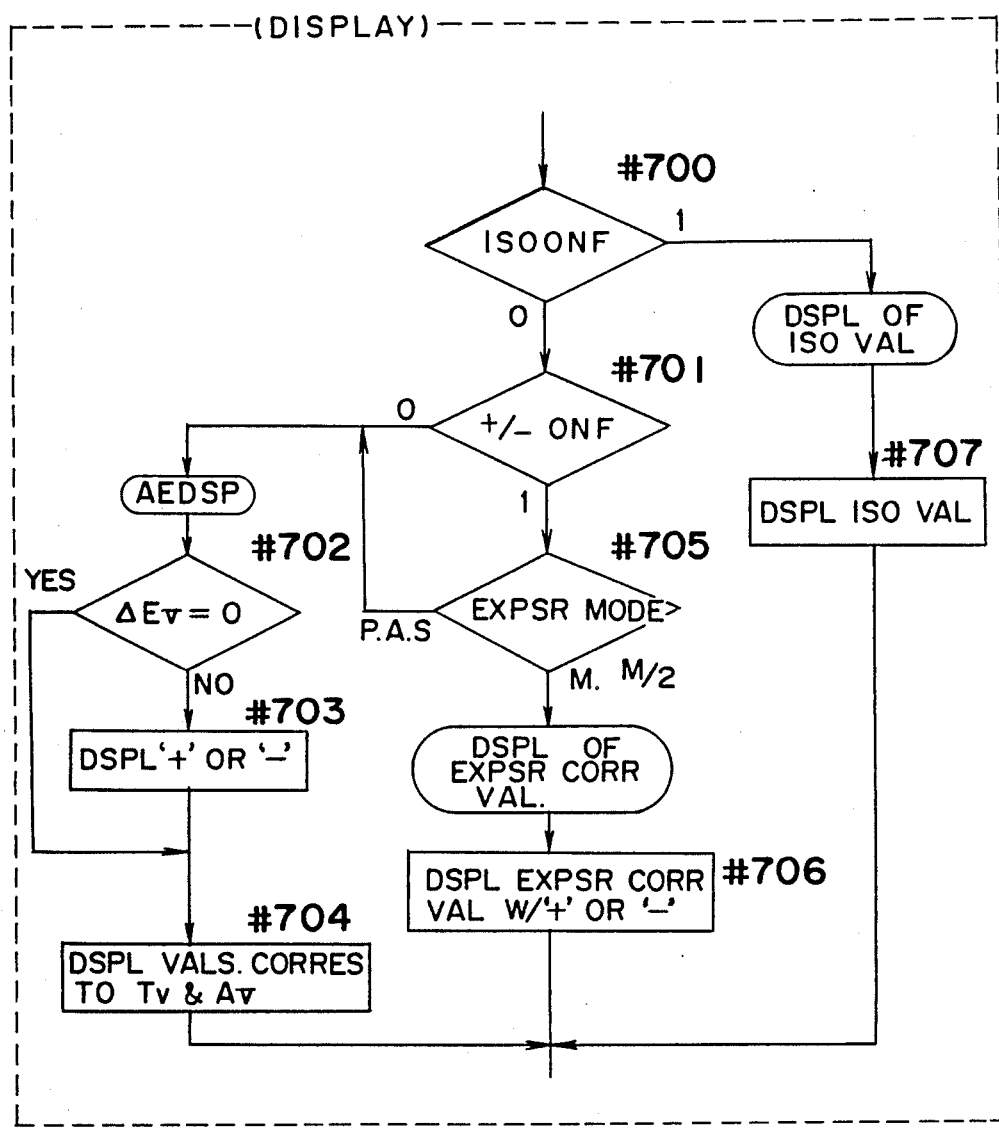

The details of the routine for the display are described next with reference to FIG. 12.

At Step #700, it is checked whether the film speed alteration flag ISOONF has been set or not. If it has been set already, the film speed is shown on the display at Step #707, as shown in FIG. 11(c).

At Step #701, where the film speed alteration flag ISOONF has not been set, it is checked whether exposure correction flag ±ONF has been set or not. If it has been set, the program proceeds to Step #705. If not, the program proceeds to Step #702.

At Step #705, the exposure mode selected is discriminated. If it is M/2 mode or M mode, the exposure correction value is displayed as shown in FIG. 11(e) at Step #706 (In the drawing, with the symbol +, the displayed value means an increment and with the symbol −, a decrement). If the exposure mode is the P, A or S mode, the operation proceeds to Step #702.

At Step #702, it is checked whether data in the exposure correction value register $\Delta EV$ (hereinafter referred to as "exposure correction value") is "0" or not. If it is "0", the shutter speed TV and the aperture value AV are shown on the display as shown in FIG. 11(b) and FIG. 11(c) at Step #704. If the exposure correction value is not "0", the positive sign "+" or negative sign "−" is displayed according to whether the exposure correction value is positive or negative at Step #703, while the shutter speed TV and the aperture value AV are shown on the display as shown in FIG. 11(f). The drawing shows that the exposure has been corrected, so that the shutter speed value and aperture value are increased to 1/90 sec. (TV =6½) and 3.5 (AV =3½), respectively.

The routine for the display, when terminated, is followed by Step #22 as shown in FIG. 3.

At Step #22, the microcomputer 1 checks whether the release switch S2 is on or not. If it is on, the microcomputer 1, at Step #23, controls the exposure according to the respective control values computed at Step #18 and stored in the control shutter speed register TVSET and control aperture value register AVSET. If the release switch S2 is off, the program proceeds to Step #24 skipping Step #23.

At Step #24, it is checked whether the switch S1 for preparing or setting the camera for photographing is on or not. If it is on, the routine for resetting and starting the timer is executed at Step #25, as at Step #9 (see FIG. 4). If it is off, the measurement using the timer, started at Step #9, is continued.

At Step #26, it is checked whether the option switch S OP2 is off or not. If it is off, the program proceeds to Step #27, and if it is on, Step #27 is skipped.

At Step #27, it is checked whether the AE lock flag AELF has been set or not. If it has been set (i.e., the AE lock is in operation), the program returns to Step #10 and follows the subsequent steps as above mentioned. If the AE lock flag AELF has not been set, the program proceeds to Step #28.

At Step #28, it is checked whether the timer, started at Step #9 or Step #25, has completed the counting of the specified time (10 or 15 seconds). If the specified time has not passed yet, the program reverts to Step #10 and follows the subsequent steps as described above. If the time has passed, the program proceeds to step #4 (the routine for "stop"), and the photographing is terminated.

In the above embodiment, values of the second type mode which do not meet the values of the first type mode are neglected as a data shifting method, but, alternatively, the data shifting may be able to be effected by raising the values of the second type mode which do not meet the values of the first type mode to the upper values of the first type mode.

Further, in the above embodiment, the light-emitting diode LED1 for illuminating the viewfinder is adapted to work by means of only the switch S LAMP. In addition to this method, the switch S LAMP may be associated with a control means for automatically turning on and off the viewfinder-illuminating light-emitting diode LED1 on the basis of the measurement result obtained by the light measuring means for measuring the luminance of the object. In this case, the operation of the light-emitting diode LED1 may be controlled by such a control means in general. But, when the camera is positioned rather in the dark in contrast to brightness of the object and it is difficult to see the information displayed in the viewfinder, the viewfinder illumination switch S LAMP may be operated so that the diode LED1 light up the inside of the viewfinder. Then, the microcomputer 1 may carried out the routine for stop in order to stop the illuminating operation of the diode LED1.

Figure 13:
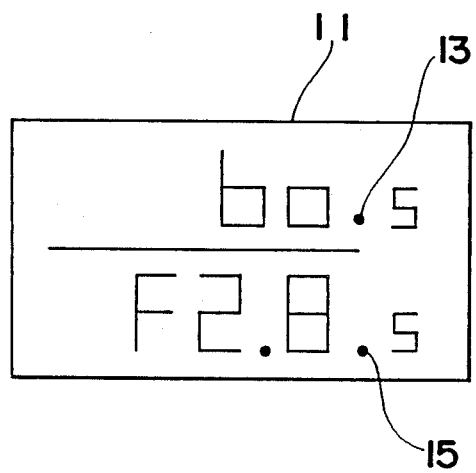
FIG. 13 shows another example of photographing information shown on the display.

Furthermore, in addition to the above embodiment where a set value is to be changed by steps of ½ EV in the first type mode and by steps of ¼ EV in the second type mode, and the dots 13 and 15 are used in the photographic information display so as to show that displayed values are of the second type mode (See FIG. 11 (a) and (b)), a set value may be changed at the rate of 1 EV in the first type mode, and 0.1 or 0.5 EV in the second type mode. Then, exposure values are displayed as shown in FIG. 13, in which numeral 5 on the right side of the dots 13 and 15 indicates that the set value changing rate corresponds to 0.5 EV. When 0.1 EV is adopted as the changing rate, the numeral 5 is replaced with numeral 1.

As will have become clear from the above description, according to the photographic information setting device of the present invention, when the exposure mode is switched from the second mode to the first mode, a value which does not meet any value of the first mode is not selected because values of the second mode are automatically shifted to values of the first mode. Therefore, the problem inherent in the conventional device that resetting of exposure-related values is required can be solved.

Moreover, according to the photographic information illuminating device of a camera of the present invention, which comprises a switch for actuating an illuminating means and a means for stopping the operation of the illuminating means when a photographic operation means completes its operation, the illuminating means is stopped without failure at the same time that the photographic preparation means completes its operation, and accordingly, the present invention solves a problem of waste of electric power caused by the operation of the illuminating means even when the illumination is not required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A photographic information setting device for a camera comprising:
   exposure information setting means for selecting a value from among values relative to exposure which are set in advance at predetermined regular intervals so as to set exposure information for a camera;
   interval altering means for altering predetermined regular intervals of one type to ones of another type, and vice versa;
   exposure controlling means for effecting an exposure control based on the exposure information set by the exposure information setting means;
   exposure mode selecting means for selecting one mode from among a plurality of exposure modes, inclusive of at least two different manual modes; and
   alteration permitting means for permitting the interval altering means to carry out the interval alteration when either of the manual modes is selected.

2. A photographic information setting device for a camera comprising:
   aperture value setting means which has at least one operating member for shifting an aperture value step by step at predetermined regular intervals, thereby being able to select an aperture value from among a plurality of values set at the predetermined regular intervals;
   operable means manually operated;
   interval altering means for altering intervals of aperture values to be shifted by the operating member from predetermined regular intervals of one type to ones of another type, and vice versa, in response to the manual operation of said operable means; and aperture value controlling means for controlling a size of an aperture opening based on the aperture value set by the aperture value setting means.

3. The device as claimed in claim 2, further comprising:

shutter speed setting means for selecting a shutter speed value from among values which are set in advance at predetermined regular intervals; and shutter speed controlling means for controlling a shutter speed based on the shutter speed value set by the shutter speed setting means.

4. A photographic information setting device for a camera comprising:

shutter speed setting means which has at least one operating member for shifting a shutter speed value step by step at predetermined regular intervals, thereby being able to select a shutter speed value from among a plurality of values set at the predetermined regular intervals;

operable means manually operated;

interval altering means for altering intervals of shutter speed values to be shifted by the operating member from predetermined regular intervals of one type to ones of another type, and vice versa, in response to the manual operation of said operable means; and shutter speed controlling means for controlling a shutter speed based on the shutter speed value set by the shutter speed setting means.

5. A photographic information setting device for a camera comprising:

exposure information setting means for selecting a value from among values relative to exposure which are set in advance at predetermined regular intervals so as to set exposure information for a camera;

interval altering means for altering predetermined regular intervals between a first type and a second type having a smaller step than the first type;

exposure controlling means for effecting an exposure control based on the exposure information set by the exposure information setting means; and display means having a first display portion for displaying set values relative to exposure and being adapted to numerically display a value included in the values set in advance at the predetermined interval of the first type and a second display portion for displaying set values relative to exposure and being adapted to indicate a value included in the values set in advance at the predetermined interval of the second type by displaying a fraction shifted from the value of the first type displayed at the first display portion.

6. A photographic information setting device for a camera comprising:

mode switching means for switching a first type exposure mode in which values relative to exposure are to be altered at the changing rate of a first type and a second type exposure mode in which values relative to exposure are to be altered at the changing rate of a second type, the changing rate of the second type being smaller than that of the first type, and values of the second type mode containing values of the first type mode; and shifting means for shifting a value set under the second type mode to a value set under the first type mode when the second type mode is switched to the first type mode.

7. The device as claimed in claim 6, wherein the shifting means shifts a value of the second type exposure mode to a value of the first type exposure mode which is the most approximate to the value of the second type exposure mode.

8. The device as claimed in claim 7, wherein the shifting is effected by increasing the value of the second type exposure mode to the most approximate value of the first type exposure mode.

9. The device as claimed in claim 7, wherein the shifting is effected by decreasing the value of the second type exposure mode to the most approximate value of the first type exposure mode.

10. The device as claimed in claim 7, further comprising display means having at least different first and second display portions for displaying set values relative to exposure, wherein the first display portion of the display means is adapted to numerically display a value corresponding to a value set in the first type exposure mode and the second display portion is adapted to display what indicates that a value on display in the first display portion is one of values of the second type exposure mode.

11. The device as claimed in claim 10, wherein the second display portion of the display means displays numerals.

12. The device as claimed in claim 11, wherein the second display portion of the display means displays things other than numerals.

13. The device as claimed in claim 6, further comprising:

exposure mode selecting means for selecting one mode from among a plurality of modes, inclusive of at least two manual modes, one of the at least two manual modes corresponding to the second type exposure mode, the other of the at least two manual modes and the modes other than the manual modes corresponding to the first type exposure mode; and mode alteration permitting means for permitting mode switching means to function so as to switch the first type and second type exposure modes when either of the manual modes is selected.

* * * * *